(12) United States Patent
Bauer et al.

(10) Patent No.: US 9,765,664 B2
(45) Date of Patent: Sep. 19, 2017

(54) APPARATUS FOR PROVIDING LIQUID ADDITIVE, METHOD FOR ASSEMBLING THE APPARATUS AND MOTOR VEHICLE HAVING THE APPARATUS

(71) Applicant: EMITEC GESELLSCHAFT FUER EMISSIONSTECHNOLOGIE MBH, Lohmar (DE)

(72) Inventors: Peter Bauer, Siegburg (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/479,693

(22) Filed: Sep. 8, 2014

(65) Prior Publication Data
US 2014/0373514 A1    Dec. 25, 2014

Related U.S. Application Data

(63) Continuation of application No. PCT/EP2013/054567, filed on Mar. 7, 2013.

(30) Foreign Application Priority Data

Mar. 7, 2012  (DE) .................. 10 2012 004 727

(51) Int. Cl.
*F01N 3/24*  (2006.01)
*F01N 3/20*  (2006.01)
(Continued)

(52) U.S. Cl.
CPC ......... *F01N 3/2006* (2013.01); *F01N 3/2013* (2013.01); *F01N 3/2066* (2013.01);
(Continued)

(58) Field of Classification Search
CPC ............ F01N 2240/16; F01N 2610/10; F01N 2240/1406; F01N 2240/1426; B60K 2015/03427
See application file for complete search history.

(56) References Cited

U.S. PATENT DOCUMENTS 8,184,964 B2  5/2012  Haeberer et al.
8,464,966 B2  6/2013  Haeberer et al.
(Continued)

FOREIGN PATENT DOCUMENTS

DE    102006046899 A1    4/2008
DE    102006061736 A1    7/2008
(Continued)

OTHER PUBLICATIONS

Machine translation of DE 102007061808 A1, accessed on Feb. 9, 2016.*
Machine translation of DE102010020200A1 accessed Nov. 2, 2016.*

*Primary Examiner* — Jonathan Matthias
(74) *Attorney, Agent, or Firm* — Laurence A. Greenberg; Werner H. Stemer; Ralph E. Locher

(57) ABSTRACT

An apparatus for providing liquid additive includes a tank for the liquid additive which has at least one heat distribution structure for distributing heat in a first tank section. A delivery unit is inserted into the tank for removing the liquid additive from the tank. The delivery unit includes at least one heating device. The heating device of the delivery unit and the heat distribution structure of the tank are connected to each other by at least one thermal coupling. A method for assembling the apparatus and a motor vehicle having the apparatus are also provided.

16 Claims, 2 Drawing Sheets

(51) Int. Cl.
    *B60K 13/04*         (2006.01)
    *B60K 15/03*         (2006.01)

(52) U.S. Cl.
    CPC .... *B60K 13/04* (2013.01); *B60K 2015/03427*
        (2013.01); *F01N 2610/02* (2013.01); *F01N
        2610/10* (2013.01); *F01N 2610/1406*
        (2013.01); *F01N 2610/1426* (2013.01); *Y02T
        10/24* (2013.01); *Y10T 29/49826* (2015.01);
        *Y10T 137/6416* (2015.04); *Y10T 137/6579*
        (2015.04)

(56) References Cited

U.S. PATENT DOCUMENTS

| | | | | |
|---|---|---|---|---|
| 2009/0107126 A1* | 4/2009 | Bugos | ................... | F01N 3/2066 60/301 |
| 2009/0127265 A1 | 5/2009 | Magnusson et al. | | |
| 2011/0138791 A1 | 6/2011 | Li et al. | | |
| 2012/0315196 A1* | 12/2012 | Maus et al. | ................... | 422/174 |
| 2012/0321525 A1 | 12/2012 | Maus et al. | | |
| 2013/0025269 A1* | 1/2013 | Hodgson | ............... | F01N 3/2066 60/317 |
| 2013/0098006 A1* | 4/2013 | Brueck et al. | ................... | 60/295 |
| 2013/0192204 A1* | 8/2013 | Hodgson | ............... | F01N 3/2066 60/274 |

FOREIGN PATENT DOCUMENTS

| | | | | |
|---|---|---|---|---|
| DE | 102007061808 A1 | | 6/2009 | |
| DE | 102009036260 A1 | | 2/2011 | |
| DE | 102010014314 A1 * | | 10/2011 | ........... F01N 3/2066 |
| DE | 102010020200 A1 * | | 11/2011 | .............. B60K 15/03 |
| EP | 1925354 A1 | | 5/2008 | |
| EP | 2336514 A2 | | 6/2011 | |
| WO | 2007126366 A1 | | 11/2007 | |
| WO | 2009077067 A1 | | 6/2009 | |
| WO | 2011086038 A1 | | 7/2011 | |
| WO | WO 2011107312 A1 * | | 9/2011 | ........... F01N 3/2066 |
| WO | WO 2011157623 A1 * | | 12/2011 | |

\* cited by examiner

APPARATUS FOR PROVIDING LIQUID ADDITIVE, METHOD FOR ASSEMBLING THE APPARATUS AND MOTOR VEHICLE HAVING THE APPARATUS

CROSS-REFERENCE TO RELATED APPLICATION

This is a continuation, under 35 U.S.C. §120, of copending International Application No. PCT/EP2013/054567, filed Mar. 7, 2013, which designated the United States; this application also claims the priority, under 35 U.S.C. §119, of German Patent Application DE 10 2012 004 727.4, filed Mar. 7, 2012; the prior applications are herewith incorporated by reference in their entirety.

BACKGROUND OF THE INVENTION

Field of the Invention

The invention relates to an apparatus for providing liquid additive in which the apparatus has a tank for the liquid additive. The apparatus is, in particular, suitable and intended for feeding the liquid additive to an exhaust-gas treatment apparatus of an internal combustion engine in a motor vehicle. The invention also relates to a method for assembling the apparatus and a motor vehicle having the apparatus.

An exhaust-gas purification method particularly commonly implemented in such exhaust-gas treatment apparatuses is the selective catalytic reduction (SCR) method in which nitrogen oxide compounds in the exhaust gas are reduced with the aid of a reducing agent. Ammonia is generally used as the reducing agent in that method. Ammonia is not normally stored directly in motor vehicles but rather in the form of a reducing agent precursor solution which can be converted to form ammonia in the exhaust gas or outside the exhaust gas in a reactor provided for that purpose. The liquid additive is then typically the described reducing agent precursor solution. A reducing agent precursor solution which is particularly commonly used in the automotive field is urea-water solution, which is available, for example, under the trademark AdBlue® and has a urea content of 32.5%.

A problem with the provision of such liquid additives is that the additives can freeze at low temperatures. The described urea-water solution with a urea content of 32.5%, for example, freezes at temperatures of −11° C. In the automotive field, such low temperatures can arise, in particular, during long standstill periods (in particular in winter).

During the starting process of a motor vehicle, it is however necessary even at such low temperatures for liquid additive to be capable of being provided as quickly as possible in order to ensure that the described exhaust-gas purification method can be carried out quickly and efficiently even after the starting of the internal combustion engine. It is therefore known for heating apparatuses to be provided for that purpose in tanks for liquid additive.

A tank for a liquid additive in a motor vehicle should be as inexpensive as possible. It is also desirable for the installation outlay for the tank to be low, in particular with regard to the installation of additional components on the tank. Furthermore, the amount of energy required for heating the liquid additive in the tank should be as low as possible. In particular, the electrical energy for heating purposes should be as low as possible, because there is generally only limited availability of electrical energy in motor vehicles. By contrast, heating the tank by using the cooling water of an internal combustion engine requires less sparing use of heating energy because the waste heat of an internal combustion engine is normally present in adequate quantities in the cooling water of the (warm/hot) internal combustion engine. However, the waste heat of the internal combustion engine is only available in limited quantities, in particular during the starting phase of the internal combustion engine, when it is sought for liquid additive to be made available quickly. It may therefore also be expedient to combine an electric heater with a cooling water-type heating apparatus. That can, however, give rise to considerable technical difficulties with regard to integration into a tank system.

SUMMARY OF THE INVENTION

It is accordingly an object of the invention to provide an apparatus for providing liquid additive, a method for assembling the apparatus and a motor vehicle having the apparatus, which alleviate or even overcome the hereinaforementioned disadvantages of the heretofore-known apparatuses, methods and vehicles of this general type. In particular, it is sought to specify an especially advantageous apparatus for providing liquid additive (in particular a reducing agent) and a method for the assembly of a corresponding apparatus for the preferred use in a motor vehicle.

With the foregoing and other objects in view there is provided, in accordance with the invention, an apparatus for providing liquid additive, the apparatus comprising a tank for the liquid additive, the tank having at least one heat distribution structure for distributing heat in a first tank section. A delivery unit which is inserted into the tank serves for the extraction of the liquid additive from the tank and has at least one heating apparatus. The heating apparatus of the delivery unit and the heat distribution apparatus of the tank are connected to one another by at least one thermal coupling.

The apparatus preferably includes the tank and the described delivery unit, which is installed in the tank. The apparatus thus constitutes an overall system that provides (stores and delivers) liquid additive (in particular urea-water solution).

A connection element is preferably provided on the apparatus. A line connected to the connection element can be used to conduct the liquid additive from the apparatus to a consumer. The consumer is, for example, a feed apparatus that feeds the liquid additive to an exhaust-gas treatment apparatus.

The tank is preferably a plastic tank, which may be produced, for example, by an injection-molding process.

The heat distribution structure may, for example, be in the form of (passively and/or autonomously) heat-conducting elements which are cast into the plastics tank or disposed on the plastics tank. The heat-conducting elements may, for example, be composed of metal and/or of a special heat-conducting plastic. It is also possible for the heat distribution structure to include "heat pipes" which permit a particularly efficient distribution of the heat even in the presence of small temperature differences. "Heat pipes" are also referred to as heat-conducting pipes. These are closed pipes in which a fluid is present partially in a gaseous phase and partially in a liquid phase and which, by evaporation and condensation, permit very efficient heat distribution.

The heat distribution structure extends through a first tank section. The first tank section is a region of the (inner) tank volume which encompasses preferably at most 30% of the tank volume and particularly preferably between 20% and 5% of the tank volume. In this case, it is also possible for the first tank section to be formed with multiple (spaced-apart) sub-volumes, and/or as one sub-volume which runs in approximately meandering fashion, of the tank. Due to the fact that the heat distribution apparatus is disposed in the first tank section, the heat distribution structure can have a (locally) very great influence on the additive within the first tank section, whereas the heat distribution structure has only a lesser influence outside the first tank section. It is preferable if, within the first tank section, every point of the tank volume is at a distance of less than 5 cm [centimeters] and particularly preferably less than 2 cm from the heat distribution structure. The heat distribution structure is capable of introducing heat into the additive in a highly effective manner in an immediate vicinity. Regions of the tank that are spaced apart further from the heat distribution structure are jointly heated only by heat conduction through the liquid additive.

The delivery unit for the extraction of the liquid additive from the tank preferably includes a housing which internally—with the exception of small ducts, lines etc.—is not filled with additive. The delivery unit has a suction point which is disposed within the tank when the delivery unit is installed in the tank and through which the delivery unit can extract liquid additive from the tank.

In the housing of the delivery unit there are preferably disposed various components that serve for the delivery of the liquid additive. Such components are, for example, a pump and/or a valve, which permit control of the delivery and/or possibly ventilation of the delivery unit if air has been drawn in at the suction point. The connection element for the connection of a line is preferably provided on the delivery unit and (when the delivery unit and the tank have been assembled to form the described apparatus) is situated on an outer side of the apparatus or of the tank in order to ensure that a line can be connected there.

The heating apparatus of the delivery unit is preferably in the form of an (areal) electric heating apparatus. The electric heating apparatus is preferably disposed on the housing of the delivery unit so as to be capable of heating liquid additive in the tank through the housing wall.

The thermal coupling between the heating apparatus and the heat distribution structure is preferably realized by using a material with good thermal conductivity which connects the heat distribution structure and the heating apparatus to one another in heat-conducting fashion. The thermal coupling may also be a constituent part of the delivery unit and/or of the heating apparatus. In this case, at any rate, suitable heat-conducting contact is provided between the heating apparatus and the heat distribution structure. The contact is produced by using the thermal coupling.

A further characteristic of the apparatus is that the heat distribution structure is a constituent part of the tank, whereas the heating apparatus is a constituent part of the delivery unit. This means, in particular, that the heat distribution structure is (fixedly) connected to the tank before the delivery unit is inserted into the tank. The heating apparatus is preferably disposed in the delivery unit in such a way that there is no direct contact in the tank between the heating apparatus and the liquid additive.

In accordance with another advantageous feature of the apparatus of the invention, the tank has an opening in the tank bottom, and the delivery unit is inserted into the opening. For this purpose, a flange into which the delivery unit can be inserted in fluid-tight fashion is preferably provided at the opening in the tank bottom.

In accordance with a further advantageous feature of the apparatus of the invention, the heating apparatus is an electric heating apparatus, and the tank has a liquid-type heater. It is thus provided both that the electric heating apparatus is provided in the delivery unit and also that an additional liquid-type heater is provided in the tank. The liquid-type heater is, for example, in the form of a cooling water line which extends in various loops (in meandering fashion) through the interior of the tank and through which (warm/hot) cooling water of the internal combustion engine flows. Through the use of a liquid-type heater of this type, it is possible for a very large volume in the tank to be thawed. A liquid-type heater is thus particularly efficient for the heating of the tank. Unfortunately, in the event of a cold start of an internal combustion engine, a liquid-type heater of this type is not yet capable of thawing liquid additive in the tank. This is because the internal combustion engine first requires a certain amount of operating time before the cooling water reaches a temperature sufficient to be able to melt liquid additive in the tank to a significant extent. It is therefore advantageous for an electric heating apparatus to additionally be provided in the delivery unit, which electric heating apparatus likewise imparts a significant heating action in the tank interior region. The liquid-type heater is preferably an integral constituent part of the tank. The liquid-type heater, or the pipes of the liquid-type heater may, for example, be at least partially cast into a tank manufactured from plastic.

The electric heater may be integrated into the delivery unit. There are normally also further electrical/electronic components disposed in the delivery unit, so that the electrical/electronic components can be contacted and installed jointly. It is regularly the case that no electrical components are required for the liquid-type heater. Therefore, with the apparatus according to the invention, the tank can be realized without electrical components and connections.

In accordance with an added advantageous feature of the apparatus of the invention, the liquid-type heater is constructed for introducing heat in a second tank section, and the first tank section and the second tank section at least partially overlap.

The second tank section, in which the liquid-type heater introduces heat into the liquid additive in the tank, is preferably significantly larger than the first tank section, in which the heat from the heating apparatus is distributed. The second tank section encompasses preferably at least 50% and particularly preferably at least 80% of the tank volume. The statement that the liquid-type heater extends through the second tank section means, in particular, that any arbitrary point of the second tank section is disposed at a distance of less than 5 cm [centimeters], preferably less than 2 cm, from the liquid-type heater. In that region, a particularly efficient introduction of heat into the additive in the tank is possible by using the liquid-type heater.

The fact that the first tank section and the second tank section at least partially overlap or are at least partially superposed means that no frozen additive can remain between the first tank section and the second tank section, and instead, an exchange of liquid additive can take place between the first tank section and the second tank section. The electric heating apparatus in the delivery unit and the liquid-type heater preferably act together in order to generate as large as possible a volume of liquid additive in the tank as rapidly as possible if (at the time of starting of the internal combustion engine) the additive in the tank has frozen.

In accordance with an additional feature of the apparatus of the invention, the liquid-type heater is at least partially embedded into a filter device in the tank, the filter device being constructed for filtering liquid additive that is delivered out of the tank by using the delivery unit.

Impurities are typically present in the liquid additive or in the tank. Such impurities should not pass into the delivery unit because they can, for example, lead to blockage of ducts in the delivery unit and, in particular, of the pump in the delivery unit. It is therefore advantageous for a filter to separate the suction point of the delivery unit from the rest of the tank volume. In this case, the filter is accordingly a constituent part of the tank and is connected, together with the liquid-type heater, to the tank. The liquid-type heater exhibits relatively high mechanical stability because it is typically manufactured from a metallic material that exhibits particularly good heat conduction characteristics. The liquid-type heater can therefore act as a type of cage that supports and/or realizes the filter device in the tank.

In accordance with yet another preferable feature of the apparatus of the invention, the heat distribution structure includes fins which extend from the tank bottom into an interior of the tank.

In accordance with yet a further advantageous feature of the apparatus of the invention, the tank has a tank wall composed of plastic, and the heat distribution structure is at least partially cast into the tank wall.

Such fins may, for example, be metal sheets which extend upward from the tank base and which are in part jointly cast into a tank manufactured from plastic. Connecting sections may be formed on the fins. When the delivery unit is installed in the tank, the connecting sections bear against the delivery unit or against the housing of the delivery unit and thus ensure thermal coupling between the heat distribution structure and the delivery unit.

In accordance with yet an added advantageous feature of the apparatus of the invention, the heat distribution structure is at least partially embedded into a filter device in the tank, the filter device being constructed for filtering liquid additive that is delivered out of the tank by using the delivery unit. The heat distribution structure may—similarly to a liquid-type heater—be embedded into a filter structure of this type. It is also possible for both the heat distribution structure and also a liquid-type heater to be embedded into a filter device in the tank. The heat distribution structure is also preferably relatively rigid. As already described further above, the heat distribution structure is preferably manufactured from a metallic material. The heat distribution structure is thus also suitable for holding the filter device in such a way that the latter maintains its position in the tank.

With the objects of the invention in view, there is also provided a method for the assembly of an apparatus for providing liquid additive, the method comprising at least the following steps:
a) providing a tank, which has at least one heat distribution structure, for the liquid additive;
b) providing a delivery unit, which has at least one heating apparatus, for the extraction of the liquid additive from the tank;
c) inserting the delivery unit into the tank; and
d) connecting the heat distribution structure and the heating apparatus by using at least one thermal coupling.

In the case of the method, it is to be emphasized that, firstly, a tank is provided into which the described heat distribution structure has already been integrated. It is only thereafter that the delivery unit that includes the heating apparatus is inserted into the tank. The delivery unit is also preferably already preassembled, and the heating apparatus is already situated in the delivery unit.

The connection of the heat distribution structure and the heating apparatus by using a thermal coupling may also take place automatically/autonomously when the delivery unit is inserted into an opening provided in the tank. The heat distribution structure may, for example, have sections which bear against the delivery unit when the delivery unit is inserted into the tank. These sections then form the described thermal coupling between the heating apparatus in the delivery unit and the heat distribution structure.

With the objects of the invention in view, there is concomitantly provided a motor vehicle, comprising an internal combustion engine, an exhaust-gas treatment apparatus for purification of exhaust gases of the internal combustion engine, a feed apparatus for feeding liquid additive into the exhaust-gas treatment apparatus, and an apparatus according to the invention for providing liquid additive to the feed apparatus.

It is pointed out that the particular advantages and embodiment features specified with regard to the apparatus according to the invention can be correspondingly applied and transferred to the described method. The same applies to the particular advantages and embodiment features presented with regard to the described method, which can be applied and transferred correspondingly to the described apparatus.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in an apparatus for providing liquid additive, a method for assembling the apparatus and a motor vehicle having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
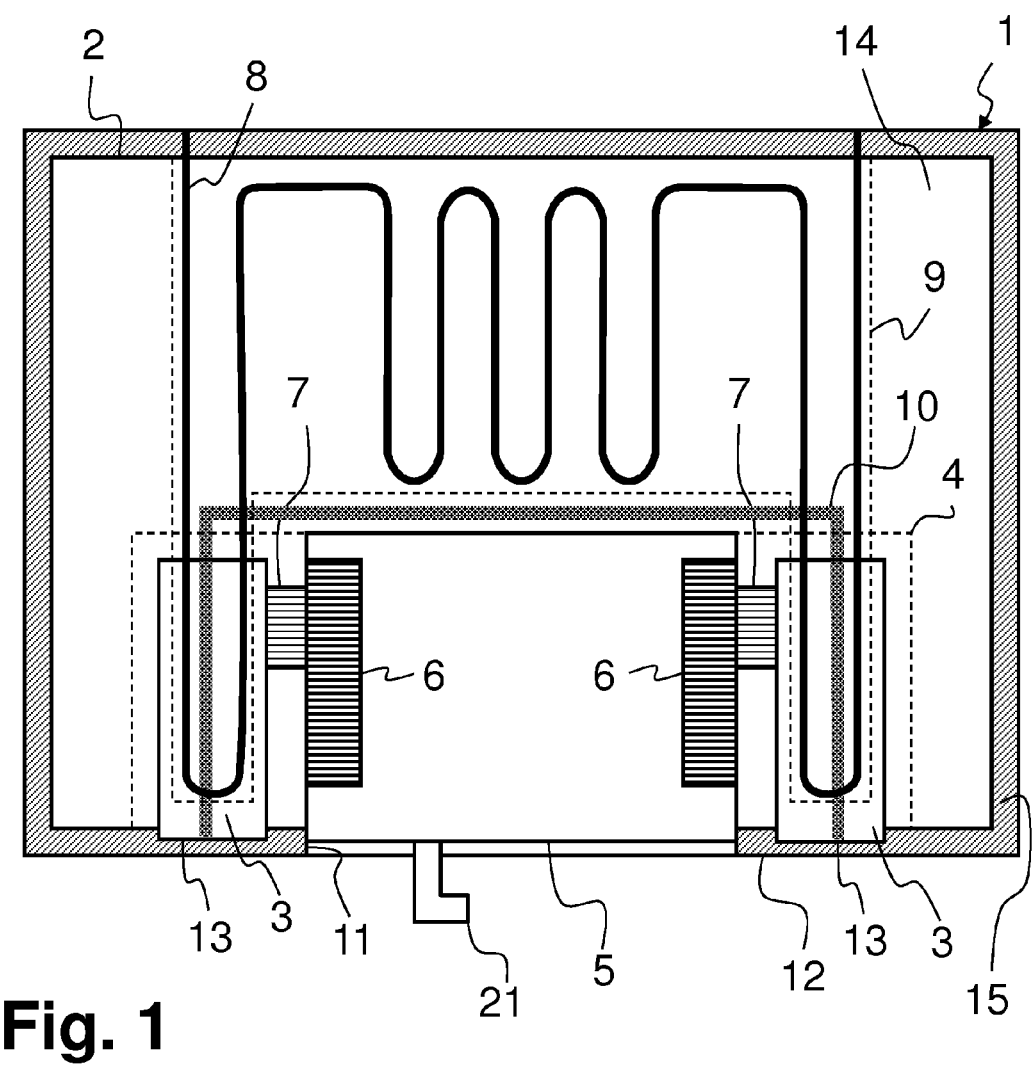
FIG. 1 is a diagrammatic, vertical-sectional view of a structural variant of an apparatus for providing liquid additive.

Referring now to the figures of the drawings in detail and first, particularly, to FIG. 1 thereof, there is seen an apparatus 1 according to the invention including a tank 2 and a delivery unit 5 for a urea-water solution, for example. The tank 2 has a tank wall 15 with a tank bottom 12. An opening 11 is provided in the tank wall 15 in the tank bottom 12 and the delivery unit 5 is inserted into the opening 11. The tank 2 has heat distribution structures or heat distributors 3 which extend from the tank bottom 12 into an interior 14 of the tank 2. Furthermore, the tank 2 has a liquid-type heater 8 which extends in the form of (meandering) heating loops through the interior 14 of the tank. The interior 14 of the tank 2 has a first tank section 4 and a second tank section 9. The liquid-type heater 8 preferably spans the second tank section 9 of the interior 14. The above-described heat distribution structures 3 preferably span the first tank section 4 of the interior 14 of the tank 2. The first tank section 4 and the second tank section 9 preferably partially overlap.

A filter device or filter 10, which is additionally provided in the tank 2, is supported at least by the liquid-type heater 8 and/or by the heat distribution structure 3. The heat distribution structure 3 and/or the liquid-type heater 8 are each integrated at least partially into the filter device 10. A heating apparatus or heater 6, which is preferably electrical, is provided in the delivery unit or deliverer 5. The heating apparatus 6 is connected to the heat distribution structure 3 through a thermal coupling 7.

As illustrated herein, the heat distribution structure 3 is, for example, in the form of fins 13.

A connection element or connector 21, to which the apparatus 1 can deliver liquid additive, is provided on the delivery unit 5 (which includes, for example, a pump, valves, sensors, control unit, etc.). From there, the additive is conducted onward through a line system to a consumer, for example.

Figure 2:
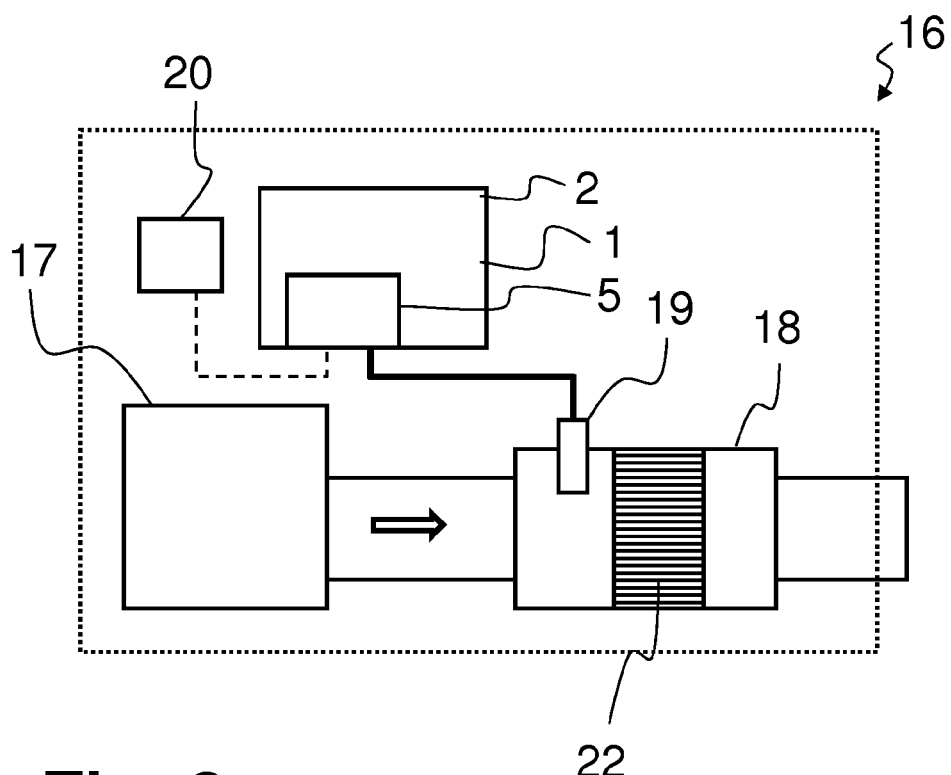
FIG. 2 is a block diagram of a motor vehicle.

FIG. 2 illustrates a motor vehicle 16 which has an internal combustion engine 17 and an exhaust-gas treatment apparatus 18 for the purification of the exhaust gases of the internal combustion engine 17. Liquid additive can be fed into the exhaust-gas treatment apparatus 18 by using a feed apparatus or feeder 19. An SCR catalytic converter 22 is preferably provided in the exhaust-gas treatment apparatus 18. The SCR catalytic converter 22 can perform the method of selective catalytic reduction, in which pollutant constituents in the exhaust gas of the internal combustion engine can be converted with the aid of the liquid additive fed in at the feed apparatus 19. Liquid additive is supplied to the feed apparatus 19 from an apparatus 1 including a delivery unit 5 and a tank 2. A control unit or controller 20 is preferably additionally provided. The control unit controls the provision of the liquid additive by using the apparatus 1.

The invention claimed is:

1. An apparatus for providing liquid additive, the apparatus comprising:
   a tank for the liquid additive, said tank having a tank wall, a first tank section and at least one heat distributor configured to distribute heat in said first tank section, said at least one heat distributor including fins cast into said tank wall;
   a delivery unit inserted into said tank and configured to extract the liquid additive from said tank, said delivery unit having a housing with a housing wall and at least one heating apparatus disposed at a location along said housing wall in said delivery unit; and
   at least one thermal coupling being in contact with the liquid additive and interconnecting said at least one heating apparatus of said delivery unit and said at least one heat distributor of said tank, said at least one thermal coupling protruding outwardly from said location along said housing wall of said delivery unit.

2. The apparatus according to claim 1, wherein said tank has a tank bottom with an opening formed therein, and said delivery unit is inserted into said opening.

3. The apparatus according to claim 1, wherein:
   said at least one heating apparatus is an electric heating apparatus; and
   said tank has a liquid-type heater being in addition to said at least one heating apparatus.

4. The apparatus according to claim 3, wherein:
   said tank has a second tank section;
   said first tank section and said second tank section at least partially overlap; and
   said liquid-type heater is configured to introduce heat in said second tank section.

5. The apparatus according to claim 4, which further comprises:
   a filter device disposed in said tank and configured to filter liquid additive delivered out of said tank by said delivery unit;
   said liquid-type heater being at least partially embedded into said filter device.

6. The apparatus according to claim 3, which further comprises:
   a filter device disposed in said tank and configured to filter liquid additive delivered out of said tank by said delivery unit;
   said liquid-type heater being at least partially embedded into said filter device.

7. The apparatus according to claim 1, wherein:
   said tank has an interior and a tank bottom; and
   said fins extend from said tank bottom into said interior.

8. The apparatus according to claim 1, wherein said tank wall is formed of plastic.

9. The apparatus according to claim 1, which further comprises:
   a filter device disposed in said tank and configured to filter liquid additive delivered out of said tank by said delivery unit;
   said at least one heat distributor being at least partially embedded into said filter device.

10. A motor vehicle, comprising:
    an internal combustion engine;
    an exhaust-gas treatment apparatus configured to purify exhaust gases of the internal combustion engine;
    a feed apparatus configured to feed liquid additive into the exhaust-gas treatment apparatus; and
    an apparatus according to claim 1 configured to provide liquid additive to the feed apparatus.

11. The apparatus according to claim 1, wherein said at least one heating apparatus includes two heating apparatuses each disposed on a respective one of said sides of said housing.

12. The apparatus according to claim 1, wherein said at least one heating apparatus is spaced apart from said top and said bottom of said housing.

13. A method for assembling an apparatus for providing liquid additive, the method comprising the following steps:
    a) providing a tank for the liquid additive, the tank having a tank wall and at least one heat distributor including fins cast into the tank wall;
    b) providing a delivery unit for withdrawing the liquid additive from the tank, the delivery unit having a housing with a housing wall and at least one heating apparatus disposed at a location along the housing wall in the delivery unit;
    c) inserting the delivery unit into the tank; and d) connecting the at least one heat distributor and the at least one heating apparatus by using at least one thermal coupling being in contact with the liquid additive, the at least one thermal coupling protruding outwardly from the location along the housing wall of the delivery unit.

14. The method according to claim 13, which further comprises:
   providing the at least one heating apparatus as an electric heating apparatus;
   providing a liquid-type heater in addition to the at least one heating apparatus; and
   heating the liquid additive in the tank by using the liquid-type heater.

15. The method according to claim 13, wherein the at least one heating apparatus includes two heating apparatuses each disposed on a respective one of the sides of the housing.

16. The method according to claim 13, wherein the at least one heating apparatus is spaced apart from the top and the bottom of the housing.

\* \* \* \* \*